(12) United States Patent
Fukushima

(10) Patent No.: US 8,526,024 B2
(45) Date of Patent: Sep. 3, 2013

(54) DOCUMENT DATA MANAGEMENT SYSTEM AND IMAGE FORMING APPARATUS, SERVER, METHOD, AND STORAGE MEDIUM CONFIGURING DOCUMENT DATA MANAGEMENT SYSTEM

(75) Inventor: Michio Fukushima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 260 days.

(21) Appl. No.: 13/224,136

(22) Filed: Sep. 1, 2011

(65) Prior Publication Data
US 2012/0062924 A1  Mar. 15, 2012

(30) Foreign Application Priority Data

Sep. 9, 2010 (JP) ................... 2010-202118
Jul. 15, 2011 (JP) ................... 2011-156603

(51) Int. Cl.
*G06F 3/12* (2006.01)
*H04N 1/00* (2006.01)
*G06K 9/54* (2006.01)
*G06K 15/00* (2006.01)

(52) U.S. Cl.
USPC ......... 358/1.13; 358/1.15; 358/1.6; 358/1.16; 382/306

(58) Field of Classification Search
None
See application file for complete search history.

(56) References Cited

U.S. PATENT DOCUMENTS

| 7,609,400 | B2 * | 10/2009 | Kuroda et al. | 358/1.13 |
| 8,064,097 | B2 * | 11/2011 | Hachiro | 358/1.6 |
| 2007/0177824 | A1 * | 8/2007 | Cattrone et al. | 382/306 |
| 2008/0123136 | A1 * | 5/2008 | Takahashi et al. | 358/1.15 |
| 2008/0212111 | A1 | 9/2008 | Masuda | |

FOREIGN PATENT DOCUMENTS

JP  2008217340 A  9/2008

* cited by examiner

*Primary Examiner* — Tammy Pham
*Assistant Examiner* — Frantz Bataille
(74) *Attorney, Agent, or Firm* — Fitzpatrick, Cella, Harper & Scinto

(57) ABSTRACT

A server for managing the operation history of document data is characterized by comprising a first saving processing unit configured to save information included in the first information for identifying the original document and information included in the second information for identifying the duplicated document upon receipt of the first information and the second information, and a second saving processing unit configured to save information for identifying the duplicated document in each predetermined group after the saving is performed in the first saving processing unit, wherein the second saving processing unit, when the number of pieces of information for identifying the original document saved by the first saving processing unit is two or more, integrates each group including the same information as the saved information for identifying the original document into one group.

10 Claims, 14 Drawing Sheets

| ORIGINAL USER'S NAME | Kazuhiro Hiraoka |
|---|---|
| LATEST USER'S NAME | - |
| TIME AND DATE | 2008/1/30 9:53 |
| DOCUMENT ID | abc |

FIG.7

| ORIGINAL USER'S NAME | Kazuhiro Hiraoka |
|---|---|
| LATEST USER'S NAME | David Jenagal |
| TIME AND DATE | 2008/9/21 14:33 |
| DOCUMENT ID | abc-1 |

FIG.8A

|  | OUTPUT 1 | OUTPUT 2 |
|---|---|---|
| USER NAME | Kazuhiro Hiraoka | David Jenagal |
| TIME AND DATE | 2008/1/30 9:53 | 2008/9/21 14:33 |
| DOCUMENT ID | abc | abc-1 |

FIG.8B

| ORIGINAL USER'S NAME | David Jenagal |
|---|---|
| LATEST USER'S NAME | - |
| TIME AND DATE | 2008/9/21 14:33 |
| DOCUMENT ID | xyz |

FIG.8C

|  | EXTRACTED EMBEDDED INFORMATION | UPDATED (GENERATED) EMBEDDED INFORMATION |
|---|---|---|
| ORIGINAL USER'S NAME | - | Kazuhiro Hiraoka |
| LATEST USER'S NAME | - | - |
| TIME AND DATE | - | 2008/1/30 9:53 |
| DOCUMENT ID | - | abc |

FIG.11A

|  | EXTRACTED EMBEDDED INFORMATION | UPDATED (GENERATED) EMBEDDED INFORMATION |
|---|---|---|
| ORIGINAL USER'S NAME | Kazuhiro Hiraoka | Kazuhiro Hiraoka |
| LATEST USER'S NAME | - | David Jenagal |
| TIME AND DATE | 2008/1/30 9:53 | 2008/9/21 14:33 |
| DOCUMENT ID | abc | abc-1 |

FIG.11B

|  | EXTRACTED EMBEDDED INFORMATION | UPDATED (GENERATED) EMBEDDED INFORMATION |
|---|---|---|
| ORIGINAL USER'S NAME | Kazuhiro Hiraoka | Kazuhiro Hiraoka |
| LATEST USER'S NAME | David Jenagal | Taro Yamada |
| TIME AND DATE | 2008/9/21 14:33 | 2009/6/15 11:25 |
| DOCUMENT ID | abc-1 | abc-2 |

FIG.11C

|  | EXTRACTED EMBEDDED INFORMATION | UPDATED (GENERATED) EMBEDDED INFORMATION |
|---|---|---|
| ORIGINAL USER'S NAME | - | Kazuhiro Hiraoka |
| LATEST USER'S NAME | - | - |
| TIME AND DATE | - | 2010/1/10 13:45 |
| DOCUMENT ID | - | def |

FIG.11D

|  | EXTRACTED EMBEDDED INFORMATION | UPDATED (GENERATED) EMBEDDED INFORMATION |
|---|---|---|
| ORIGINAL USER'S NAME | Kazuhiro Hiraoka | Kazuhiro Hiraoka |
| LATEST USER'S NAME | - | Toshiro Sadamitsu |
| TIME AND DATE | 2010/1/10 13:45 | 2010/4/10 20:43 |
| DOCUMENT ID | def | def-1 |

FIG.11E

|  | EXTRACTED EMBEDDED INFORMATION | UPDATED (GENERATED) EMBEDDED INFORMATION |
|---|---|---|
| ORIGINAL USER'S NAME | − | Kazuhiro Hiraoka |
| LATEST USER'S NAME | − | − |
| TIME AND DATE | − | 2010/6/19 11:46 |
| DOCUMENT ID | − | efg |

FIG.11F

|  | EXTRACTED EMBEDDED INFORMATION | UPDATED (GENERATED) EMBEDDED INFORMATION |
|---|---|---|
| ORIGINAL USER'S NAME | Kazuhiro Hiraoka(1)<br>Kazuhiro Hiraoka(2) | Kazuhiro Hiraoka |
| LATEST USER'S NAME | Toshiro Sadamitsu(1)<br>− (2) | Taro Yamada |
| TIME AND DATE | 2010/4/10 20:43(1)<br>2010/6/19 11:46(2) | 2010/7/28 15:03 |
| DOCUMENT ID | def-1(1)<br>efg(2) | def1efg-1 |

FIG.11G

|  | EXTRACTED EMBEDDED INFORMATION | UPDATED (GENERATED) EMBEDDED INFORMATION |
|---|---|---|
| ORIGINAL USER'S NAME | − | Toshiro Sadamitsu |
| LATEST USER'S NAME | − | − |
| TIME AND DATE | − | 2010/8/1 14:25 |
| DOCUMENT ID | − | hij |

FIG.11H

|  | EXTRACTED EMBEDDED INFORMATION | UPDATED (GENERATED) EMBEDDED INFORMATION |
|---|---|---|
| ORIGINAL USER'S NAME | Kazuhiro Hiraoka(1)<br>Toshiro Sadamitsu(2) | Kazuhiro Hiraoka |
| LATEST USER'S NAME | − (1)<br>− (2) | Seiji Mimura |
| TIME AND DATE | 2008/1/30 9:53(1)<br>2010/8/1 14:25(2) | 2010/8/31 10:07 |
| DOCUMENT ID | abc(1)<br>hij(2) | abchij-1 |

FIG.11I

|  | DOCUMENT ID | ORIGINAL DOCUMENT ID | LATEST USER'S NAME | TIME AND DATE |
|---|---|---|---|---|
| DATA1 | abc | - | Kazuhiro Hiraoka | 2008/1/30 9:53 |
| DATA2 | abc-1 | abc | David Jenagal | 2008/9/21 14:33 |
| DATA3 | abc-2 | abc-1 | Taro Yamada | 2009/6/15 11:25 |
| DATA4 | def | - | Kazuhiro Hiraoka | 2010/1/10 13:45 |
| DATA5 | def-1 | def | Toshiro Sadamitsu | 2010/4/10 20:43 |
| DATA6 | efg | - | Kazuhiro Hiraoka | 2010/6/19 11:46 |
| DATA7 | def1efg-1 | def-1 efg | Taro Yamada | 2010/7/28 15:03 |
| DATA8 | hij | - | Toshiro Sadamitsu | 2010/8/1 14:25 |
| DATA9 | abchij-1 | abc hij | Seiji Mimura | 2010/8/31 10:07 |

| DOCUMENT ID | GROUP 1 |
|---|---|
| | abc |
| | |
| | |

FIG.14B

| DOCUMENT ID | GROUP 1 |
|---|---|
| | abc |
| | abc-1 |
| | |

FIG.14C

| DOCUMENT ID | GROUP 1 |
|---|---|
| | abc |
| | abc-1 |
| | abc-2 |

FIG.14D

| DOCUMENT ID | GROUP 1 | GROUP 2 |
|---|---|---|
| | abc | def |
| | abc-1 | |
| | abc-2 | |

FIG.14E

| DOCUMENT ID | GROUP 1 | GROUP 2 |
|---|---|---|
| | abc | def |
| | abc-1 | def-1 |
| | abc-2 | |

FIG.14F

| DOCUMENT ID | GROUP 1 | GROUP 2 | GROUP 3 |
|---|---|---|---|
| | abc | def | efg |
| | abc-1 | def-1 | |
| | abc-2 | | |

FIG.14G

| DOCUMENT ID | GROUP 1 | GROUP 2+3 | |
|---|---|---|---|
| | | | FORMER GROUP 2 |
| | | | FORMER GROUP 3 |
| | abc | def | |
| | abc-1 | def-1 | |
| | abc-2 | efg | |
| | | deflefg-1 | |

FIG.14H

| DOCUMENT ID | GROUP 1 | GROUP 2+3 | | GROUP 4 |
|---|---|---|---|---|
| | | | FORMER GROUP 2 | |
| | | | FORMER GROUP 3 | |
| | abc | def | | hij |
| | abc-1 | def-1 | | |
| | abc-2 | efg | | |
| | | deflefg-1 | | |

FIG.14I

| DOCUMENT ID | GROUP 1+4 | | GROUP 2+3 | |
|---|---|---|---|---|
| | | FORMER GROUP 1 | | FORMER GROUP 2 |
| | | FORMER GROUP 4 | | FORMER GROUP 3 |
| | abc | | def | |
| | abc-1 | | def-1 | |
| | abc-2 | | efg | |
| | hij | | deflefg-1 | |
| | abchij-1 | | | |

DOCUMENT DATA MANAGEMENT SYSTEM AND IMAGE FORMING APPARATUS, SERVER, METHOD, AND STORAGE MEDIUM CONFIGURING DOCUMENT DATA MANAGEMENT SYSTEM

BACKGROUND OF THE INVENTION

1. Field of the Invention

The present invention relates to a document data management system for tracing the operation history of document data to which a code image is attached.

2. Description of the Related Art

As methods for getting an idea who has printed or duplicated (copied) printed matter or duplicated matter, there already exist various techniques. For example, according to Japanese Patent Laid-Open No. 2008-217340, when printing, identification information (ID) for distinguishing and identifying the printed matter from other printed matter is printed together and the ID and information for identifying a user who has provided instructions for printing (for example, a user's name etc.) are associated to each other and stored in a server. Because of this, it is possible to investigate who has printed the printed matter later. That is, by scanning the printed matter etc. through the use of a reading apparatus (scanner), the ID of the user is found and the user's name associated with the ID is read from the server and displayed, and thus it is possible to identify the printer who has printed the printed matter. Furthermore, when the printed matter is copied, the original ID is erased and a duplicated matter to which a new ID is attached instead is printed. At this time, information at the time of copying is added to the server. For example, it is defined that first a user A creates and prints document data and "1" is printed as an ID on the printed matter, and information "ID:1" and "printing user: A" is stored in the server. Then, when a user B copies the printed matter, "2" as a new ID is printed on the duplicated matter and information "ID:2", "duplication user: B", "ID:1→2" is added to the server. In this case, by scanning the duplicated matter, it is possible to grasp the fact that the duplicated matter is duplicated by the user B and also that the user A has first printed from the information "ID:1→2".

According to the technique described in Japanese Patent Laid-Open No. 2008-217340, it is premised that the number of IDs obtained by scanning printed matter etc. is always one. However, in a practical operating scene of the technique for attaching a code image to a document for the purpose of managing document data, limiting duplication, etc., it can happen daily that two or more code images are detected by one-time scan. An example is shown below, in which two or more code images are detected by one-time scan.

First, a case where a plurality of documents is set on a document reading table at the same time is included. FIG. 10A shows a case where two documents are set on an image reading unit (scanner unit) of a multifunction peripheral. Reference numeral 1001 represents a pressure plate and plays a role in pressing the document from above so as to prevent it from moving at the time of a scan. Reference numeral 1002 represents a document reading table and a document 1003 and a document 1004 both of A4 size to which a code image is attached, respectively, are placed and set in a state where they look like one A3 size sheet. The broken line indicates the printed position of the code image on each document. In this state, if a user provides operation instructions for copying, the two documents are scanned at the same time and one piece of image data is acquired, and thus, from the image data, two code images are detected.

Next, a case where two or more code images are attached originally to a document to be scanned is included. FIG. 10B shows an example of a document to which code images (QR codes) are attached to two positions, that is, the top-left corner and the top-right corner. Normally, one QR code is attached to one document and for example, when it is copied, the position to which a QR code is attached on the document to be copied and output (hereinafter referred to as a "duplicated document") is the position to which the QR code is attached on the document to be copied (hereinafter, referred to as an "original document"). That is, as a general rule, the QR code on the duplicated document is the QR code attached to the original document, the information of which is updated. However, when the document is set on the document reading table in an inclined state or the QR code is stained, there may be a case where the QR code is not detected correctly or decoding fails even if it is detected correctly. As a result, the QR code on the original document is recognized as just a figure and a new QR code may be attached separately to the duplicated document. FIG. 10B shows a duplicated document 1005 output in such circumstances and there exist a QR code 1006 on the original document, which has been recognized as a figure, and a QR code 1007 attached separately as a new code image.

The case where two or more image codes are detected in one-time scan as described above is not at all taken into consideration in the technique in Japanese Patent Laid-Open No. 2008-217340. That is, there is not at all a description on how to manage information in a case where a plurality of code images is detected as a result of a scan of a document at the time of copying and such circumstances occur where there exists a plurality of pieces of information, such as an ID of the document, and thus such a case has not been able to be dealt with.

SUMMARY OF THE INVENTION

The present invention is a server for managing the operation history of document data, characterized by comprising a receiving unit configured to receive first information obtained by decoding a code image attached to an original document at the time of duplication, and second information that is information of a code image attached to a duplicated document and which is obtained by updating the first information, a first saving processing unit configured to save information included in the first information for identifying the original document and information included in the second information for identifying the duplicated document upon receipt of the first information and the second information, and a second saving processing unit configured to save information for identifying the duplicated document in each predetermined group after the saving is performed in the first saving processing unit, wherein the second saving processing unit, when the number of pieces of information for identifying the original document saved by the first saving processing unit is two or more, integrates each group including the same information as the saved information for identifying the original document into one group.

According to the present invention, even when two or more code images are detected from a document, it is possible to appropriately manage information, such as an ID of the document, and to trace the operation history of the document data.

Further features of the present invention will become apparent from the following description of exemplary embodiments (with reference to the attached drawings).

BRIEF DESCRIPTION OF THE DRAWINGS

FIG. 7 is a diagram showing an example of embedded information obtained by decoding processing;

FIGS. 8A-8C are diagrams showing examples of updated embedded information;

FIGS. 11A-11I are diagrams showing examples of embedded information to be sent from an MFP to a server;

FIG. 12 is a diagram showing an example of a first data table;

FIGS. 14A-14I are diagrams showing examples of a second data table.

DESCRIPTION OF THE EMBODIMENTS

First Embodiment

Figure 1:
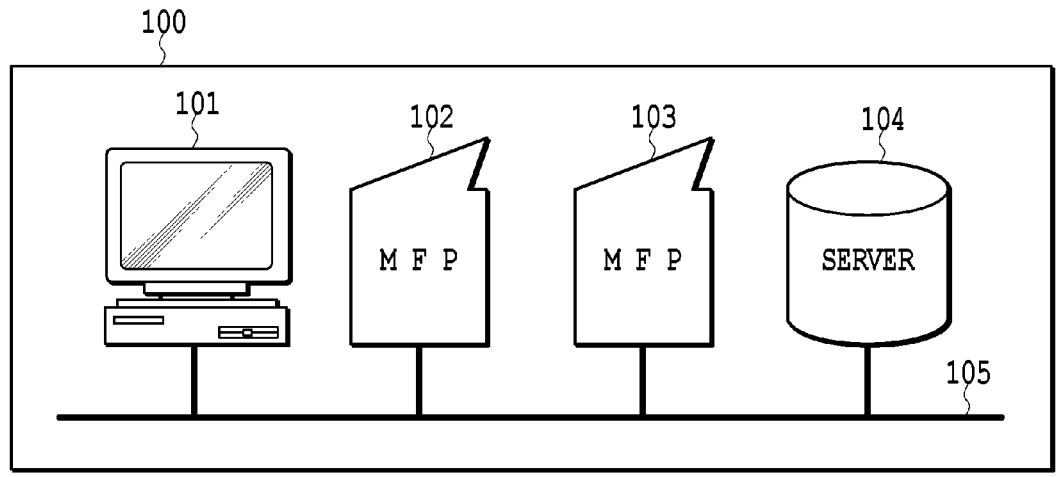
FIG. 1 is diagram showing an example of a configuration of a document data management system according to the present invention.

FIG. 1 is a diagram showing an example of a document data management system 100 according to the present invention.

The document data management system 100 is configured by a PC 101, MFPs 102/103, and a server 104 and is interconnected via a network 105, such as a LAN.

The PC 101 is an information processing apparatus, such as a personal computer, and comprises a CPU, RAM, ROM, hard disk, external storage apparatus, network interface, display, keyboard, mouse, etc.

The MFPs 102/103 are multifunction peripherals as an image forming apparatus having the scanner function, duplication function, printing function, transmission function, etc. The image forming apparatus can be any apparatus as long as it can form an image on a memory or on paper, and is not limited to the MFP. The document data management system in FIG. 1 includes the two MFPs 102/103, but may include one or three or more.

The server 104 is an information processing apparatus that stores various files, data, etc., sent from the PC 101 and MFPs 102/103.

(Hardware Configuration)

Figure 2:
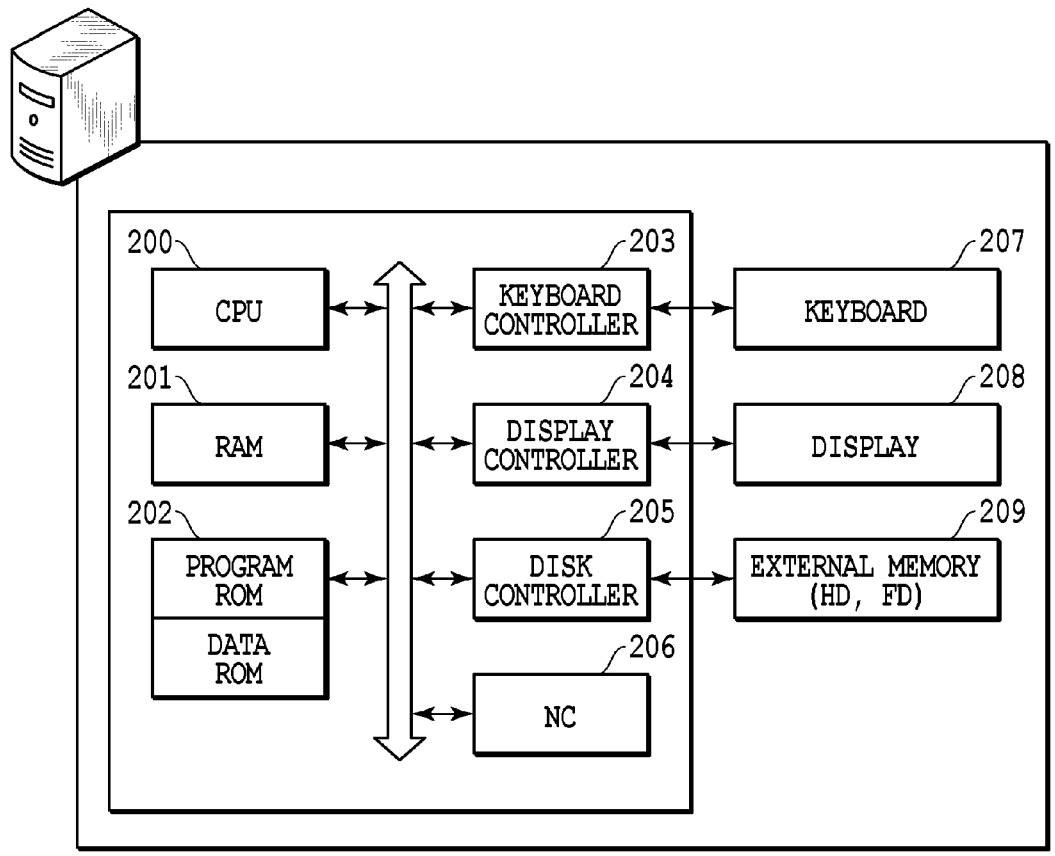
FIG. 2 is a diagram showing an example of a hardware configuration of a PC and a server configuring a document data management system.
Figure 3:
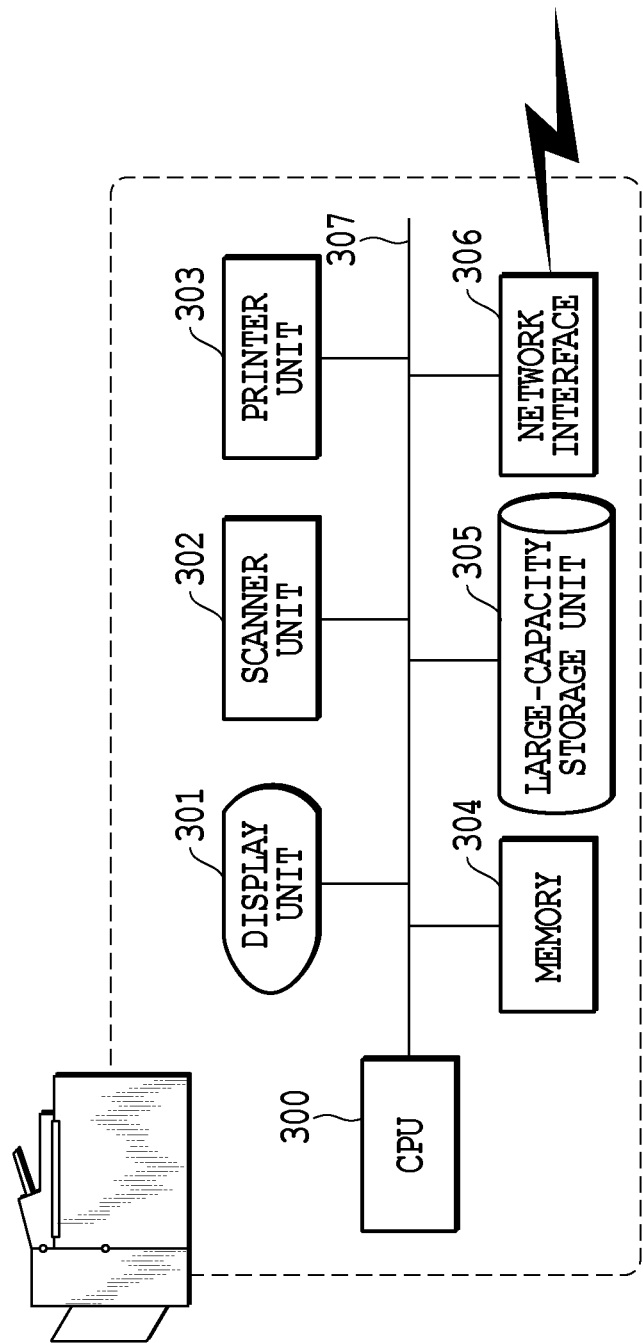
FIG. 3 is a diagram showing an example of a hardware configuration of an MFP configuring a document data management system.

FIG. 2 is a diagram showing an example of a hardware configuration of the PC 101 and the sever 105 and FIG. 3 is a diagram showing an example of a hardware configuration of the MFPs 102/103.

In FIG. 2, a CPU 200 executes programs, such as an OS and application stored in a program ROM of a ROM 202 or loaded from a hard disk 209 to a RAM 201. The RAM 201 functions as a main memory, work area, etc., of the CPU 200. A keyboard controller 203 controls key input from a keyboard 207 or pointing device, not shown schematically. A display controller 204 controls the display of various displays 208. A disk controller 205 controls data access in the hard disk (HD) 209, a floppy (registered trademark) (FD), etc., which store various pieces of data. An NC 206 is connected to a network and performs communication control processing along with other equipment connected to the network.

In FIG. 3, a CPU 300 is a processor that comprehensively controls the MFPs 102/103 and controls each unit connected via an internal bus 307. A display unit 301 is configured by an image display apparatus such as a touch panel, and a user provides instructions for duplication etc. via a screen displayed on the display unit 301. A scanner unit 302 has a function of acquiring image data by scanning a document. A printer unit 303 has a function of printing an image on a recording medium such as paper. A memory 304 stores various commands (including application programs) executed by the CPU 300 to control the MFPs 102/103 and in a large-capacity storage unit 305, image data scanned by the scanner unit 302 is saved temporarily. A network interface 306 performs transmission/reception of various pieces of data according to the CPU 300 via the network 105.

(Software Configuration)

Figure 4:
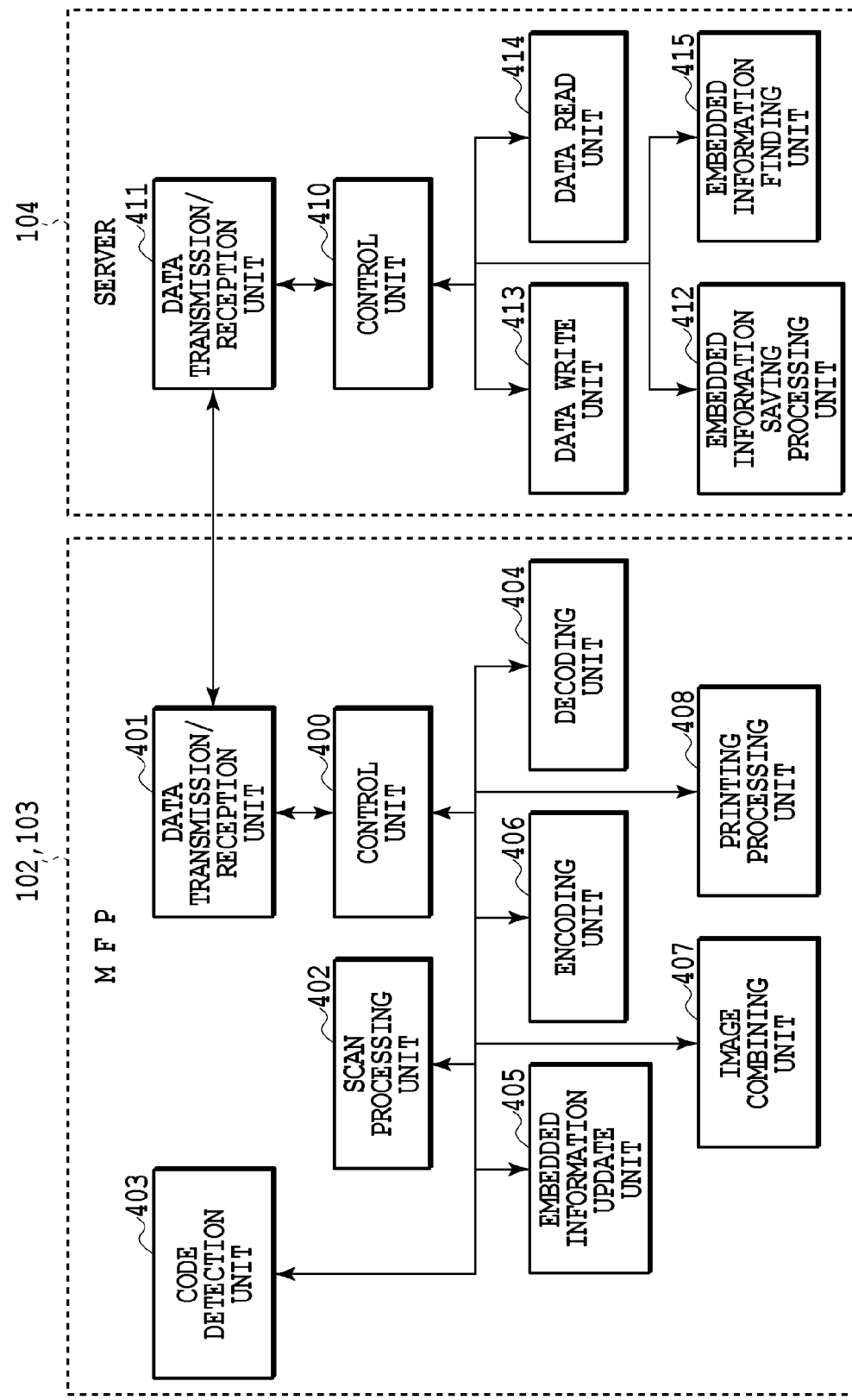
FIG. 4 is a diagram showing an example of a software configuration of the present document data management system.

FIG. 4 is a diagram showing an example of a software configuration of the present document data management system. The broken lines indicate the MFPs 102/103 and the server 104, respectively.

First, the MFPs 102/103 are explained.

A control unit 400 controls the whole of the MFPs 102/103 and provides instructions to and manages each unit, to be described layer.

A data transmission/reception unit 401 performs transmission/reception processing of data etc. with the server 104. Although omitted here, the data transmission/reception unit 401 performs transmission/reception processing of data etc. also with the PC 101.

A scan processing unit 402 scans a document set to a document reading table based on the operation instructions by a user given via a UI and performs processing of acquiring image data.

A code detection unit 403 performs processing to detect a QR code from image data acquire by a scan. In the present specification, as a code image to be attached to a document, the QR code, which is the typical two-dimensional code, will be explained as an example, but this is not limited. For example, it is possible to widely apply the present invention to techniques for attaching an image, such as a one-dimensional code and digital watermark, which is specific information coded in order to manage document data, limit duplication, etc. In the present specification, the "document" is used as a term that refers to printed matter and duplicated matter on which specific information including characters and figures is printed. Furthermore, in the present specification, the "document data" is used as a term that refers to specific information itself including characters and figures on printed matter and duplicated matter. This means that, for example, printed matter A and its duplicated matter B are distinguished as different documents, but the characters and figures included therein are the same, and thus they are identical as document data.

A decoding unit 404 performs processing of extracting embedded information by decoding a detected QR code.

An embedded information update unit 405 performs processing of generating new embedded information to be attached to a duplicated document by updating the contents of the embedded information. When there exists no embedded information to be updated (for example, when no QR code is attached to the document to be copied), the embedded information update unit 405 also performs processing of generating embedded information newly.

An encoding unit 406 performs processing of generating a QR code as a code image by encoding the updated (or newly generated) embedded information.

An image combining unit 407 performs processing of combining image data to be printed and a QR code generated by encoding processing.

A printing processing unit 408 performs printing processing, that is, processing of forming an image on a recording medium such as paper, based on the combined image data obtained by combining processing.

Next, the server 104 will be explained.

A control unit 410 controls the whole of the server 104 and provides instructions to and manages each unit, to be described later.

A data transmission/reception unit 411 performs transmission/reception processing of data etc. with the MFPs 102/103. Although omitted in FIG. 4, the data transmission/reception unit 411 also performs transmission/reception processing of data etc. with the PC 101.

An embedded information saving processing unit 412 performs various kinds of processing necessary when registering embedded information received from the MFPs 102/103 based on the instructions of the control unit 410. Although not shown schematically, the embedded information saving processing unit 412 includes a first saving processing unit and a second saving processing unit. The first saving processing unit performs processing of saving the received embedded information in order of reception time and the second saving processing unit performs processing of saving the ID of a document in each predetermined group on the basis of units of document data through the use of the embedded information saved in order of reception time. The information for identifying a document may be information that combines the number of output copies, the number of pages, time and date of output, output equipment, etc., in place of the ID of the document. In such a case, the information that combines those is saved in the embedded information saving processing unit 412 in place of the document ID.

An embedded information finding unit 415 performs processing of finding information associated with the document from the information for identifying the document such as the document ID, received from the MFPs 102/103 based on the instructions of the control unit 410.

A data write unit 413 performs processing of writing and saving various pieces of data other than the embedded information to a hard disk etc., not shown schematically, based on the instructions of the control unit 410.

A data read unit 414 performs processing of reading various pieces of data including the embedded information from a hard disk etc., not shown schematically, based on the instructions of the control unit 410.

<Explanation of Document Attached with Code Image>

Figure 5:
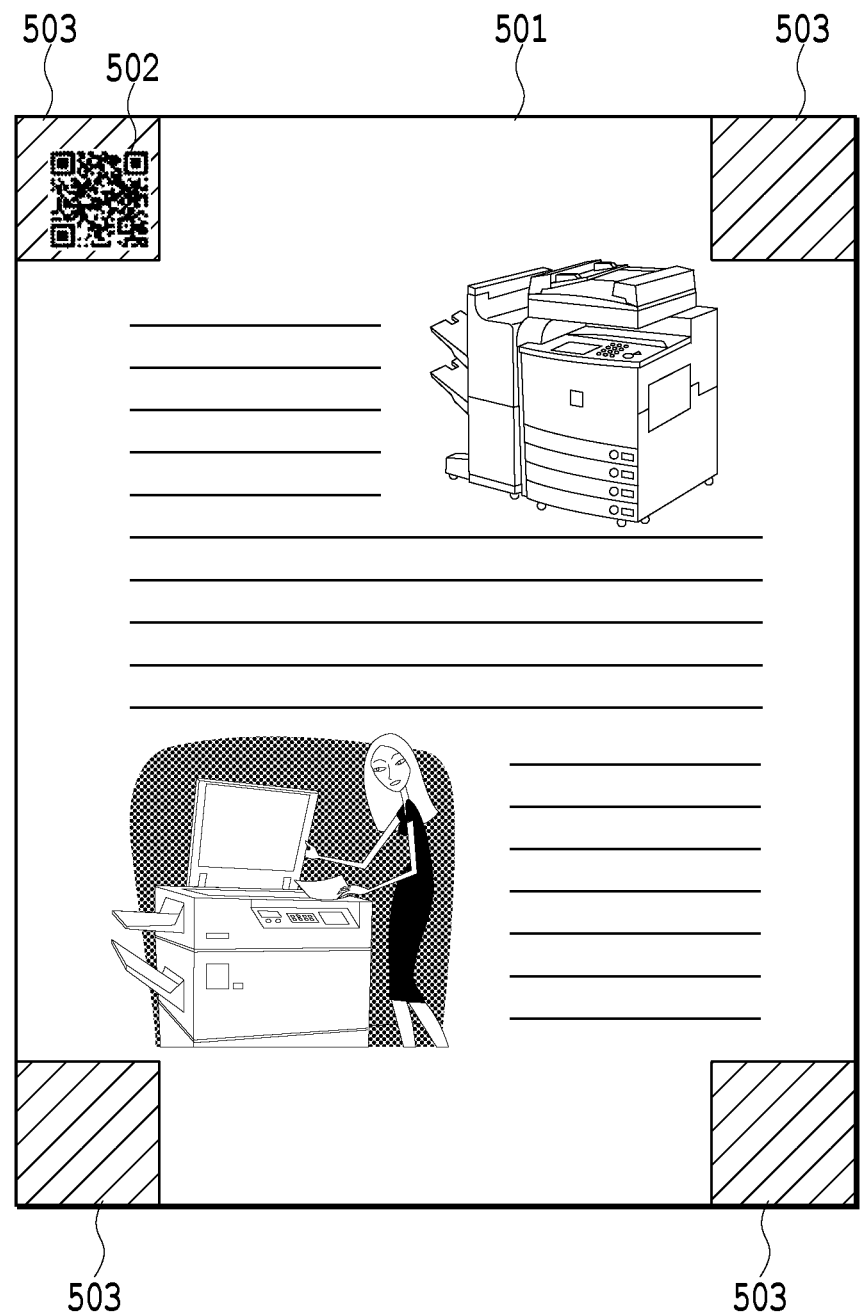
FIG. 5 is a diagram showing an example of a document to which a code image is attached.

FIG. 5 is a diagram showing an example of a document attached with a code image to be scanned in the present invention.

On a document 501, a QR code 502 as a code image obtained by encoding embedded information is printed. The QR code is printed in a predetermined region on a recording medium, that is, in the present embodiment, within a rectangular region 503 provided in the top-left corner, bottom-left corner, top-right corner, and bottom-right corner provided within the document 501 and processing of detecting the QR code is performed for the region. The length of one side of the rectangular region is, for example, 30 mm in the longitudinal and transverse directions, respectively. The region within which a QR code can be printed is not limited to this example and the position, shape, and size thereof can be set arbitrarily.

Then, it is defined that the embedded information includes the following four pieces of information.

Document ID for uniquely identifying a document

Name of a latest user who has provided instructions for outputting the document (Latest User's Name)

Name of an original user who has provided instructions for outputting the document data (Original User's Name)

Time and date when the document is output

The contents of the embedded information are not limited to those and it may also be possible to add information about, for example, the kind of output (information about whether printing by transmission of image data or copy printing using a document reading table) etc. according to the necessity. Furthermore, as described above, it may also be possible to use the information that combines the number of output copies, the number of pages, time and date of output, output equipment, etc., as the information for uniquely identifying a document in place of the document ID.

<Explanation of Processing in MFPs 102/103>

As to processing in the MFPs 102/103, an outline of copy printing processing will be explained first.

Figure 6:
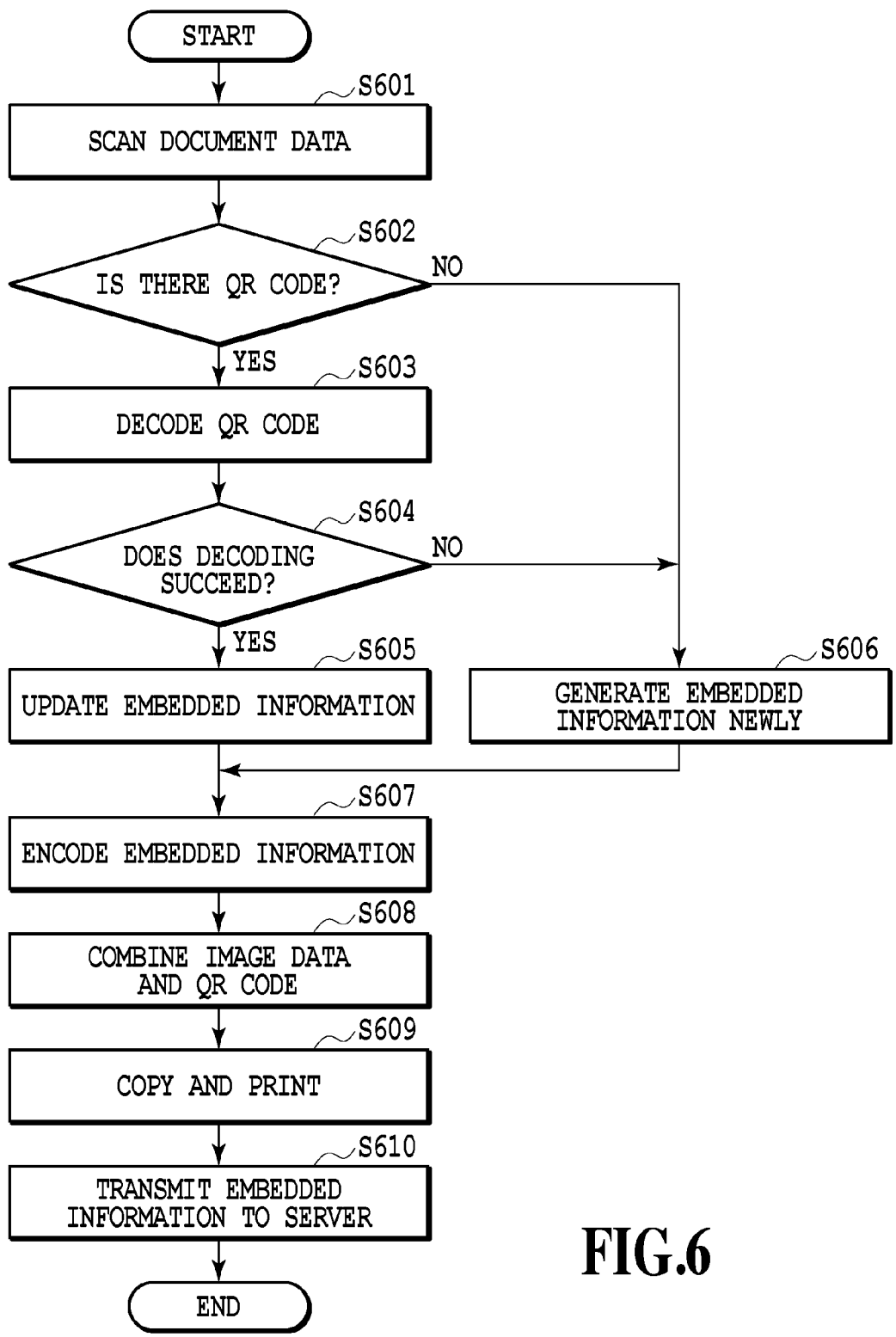
FIG. 6 is a flowchart showing a flow at the time of copy printing processing in an MFP.

FIG. 6 is a flowchart showing a flow at the time of copy printing processing in the MFPs 102/103. In the present embodiment, an application (program) stored in the memory 204 is activated by the operation instructions by a user and each of the following steps is implemented by the CPU 300 executing the application.

When a user sets a document to be copied on the document reading table of the MFPs 102/103 and presses a printing instruction button, not shown schematically, the scan processing unit 402 starts to scan the document set on the document reading table of the MFPs 102/103 in step 601. Because of this, one piece of image data is acquired. As described above, the document that is copied in copy printing is called the "original document", but there may be a case where the original document itself is duplicated matter (when a duplicated document copied previously is further copied etc.).

In step 602, the code detection unit 403 detects a QR code from the acquired image data. That is, the code detection unit 403 checks for the presence/absence of a QR code for the rectangular regions in the four corners described above of the acquired image data. If a QR code is detected, the processing proceeds to step 603.

In step 603, the decoding unit 404 decodes the detected QR code. That is, the decoding unit 404 performs processing of extracting embedded information by decoding the QR code. FIG. 7 shows an example of embedded information (first information) extracted by the decoding processing. In the example in FIG. 7, a user's name "Kazuhiro Hiraoka" of the user who has provided instructions to print the original document, the time and date "2008/1/30 9 : 53" when the original document is output, and the document ID "abc" for uniquely identifying the original document are extracted. That the "Latest User's Name" box is blank means that this document is a document on which document data is printed for the first time, and thus an original document not copied yet by any user. If this original document is a document copied by any user, a user's name of the user who has copied latest is shown in the "Latest User's Name" box as a result. When two or more QR codes are detected in step 602, decoding processing is performed on all the QR codes and embedded information is extracted therefrom.

In step 604, the embedded information update unit 405 determines whether decoding succeeds and embedded information can be extracted. When embedded information can be extracted, the processing proceeds to step 605. When decoding fails because of stain of the QR code etc., the processing proceeds to step 606.

In step 605, the embedded information update unit 405 updates the embedded information (first information) extracted in step 603. Specifically, the embedded information update unit 405 inputs the name of a user who has created the original document in "Original User's Name" and the name of the user who has provided instructions for copying this time in "Latest User's Name". Then, the embedded information update unit 405 generates the time and date of the copying and output and a new document ID for the duplicated document and updates the contents of the embedded information. FIG. 8A shows an example of the updated contents (second information) of the embedded information shown in FIG. 7, which are updated in the present step. The user's name "David Jenegal" of the user who has copied is input in the "Latest User's Name" box and the user's name "Kazuhiro Hiraoka" of the user who has created the original document in the "Original User's Name" box. Furthermore, it can be known that the time and date of copying by "David Jenegal" is "2008/9/21 14:33" and a new document ID "abc-1" is given to the duplicated document to be output. As the method of updating embedded information, a method of adding information about this time copying and output while leaving all the embedded information of the original document as it is can also be conceived of. FIG. 8B shows an example of embedded information to be added in this manner and an output 1 shows the embedded information of the original document and an output shows information about this time copying and output. Furthermore, when two or more QR codes are detected in step 602 and two or more pieces of embedded information are extracted in step 603, only one of the extracted pieces of embedded information is updated. At this time, the embedded information including information with the oldest time and date of them is updated and the other pieces of embedded information are not updated. When there is a plurality of pieces of embedded information including the oldest time and date, the embedded information of the QR code detected earlier is updated and the other pieces of embedded information are not updated.

In contrast, when no QR code is detected in step 602 and when decoding fails in step 604, the embedded information update unit 405 generates new embedded information to be embedded newly in the document to be copied and output in step 606. FIG. 8C shows an example of new embedded information generated in this step. Because the embedded information is generated newly, the user's name "David Jenegal" of the user who has provided instructions for copying this time is input in the "Original User's Name" box not in the "Latest User's Name" box. In step 607, the encoding unit 406 performs processing of generating a QR code by encoding the embedded information (second information) updated in step 605 or the embedded information newly generated in step 606.

In step 608, the image combining unit 407 combines the generated QR code and the image data obtained in step 601. As a result of that, when a QR code is attached to the original document, combined image data combined with a QR code, the contents of the embedded information of which are updated, is generated. At this time, the QR code attached to the original document is erased. This erasure may be performed by overwriting the attached QR code with the QR code the contents of which are updated. When two or more QR codes are attached to the original document and decoding processing of two or more QR codes succeeds, the QR code including the embedded information to be updated in step 605 is erased as a result. At this time, the other QR code (s) is left as it is. Because of this, a duplicated document is created as a result, on which the QR codes in the same number as the number of QR codes attached to the original document are attached to the same positions of the original document. In contrast, when no QR code is attached to the original document, combined image data combined with a newly generated QR code is generated.

In step 609, the printing processing unit 408 forms an image on a recording medium such as paper, based on the generated combined image data and outputs it. The duplicated document printed is output to an output tray, not shown schematically. When printing processing is completed, the processing proceeds to step 610.

In step 610, the data transmission/reception unit 401 transmits embedded information in accordance with the determination results in step 602 and step 604 to the server 104. For example, when a QR code is detected and decoding of the QR code succeeds, the data transmission/reception unit 401 transmits the embedded information (first information) of the original document extracted in step 603 and the embedded information (second information) updated in step 605 to the server 104. When no QR code is detected in step 602 or decoding fails in step 604, the data transmission/reception unit 401 transmits the embedded information generated newly in step 606 to the server 104. Registering processing of embedded information received by the server 104 will be described later.

Next, an outline of a case where printing processing is performed based on image data received from the PC 101 will be explained.

Figure 9:
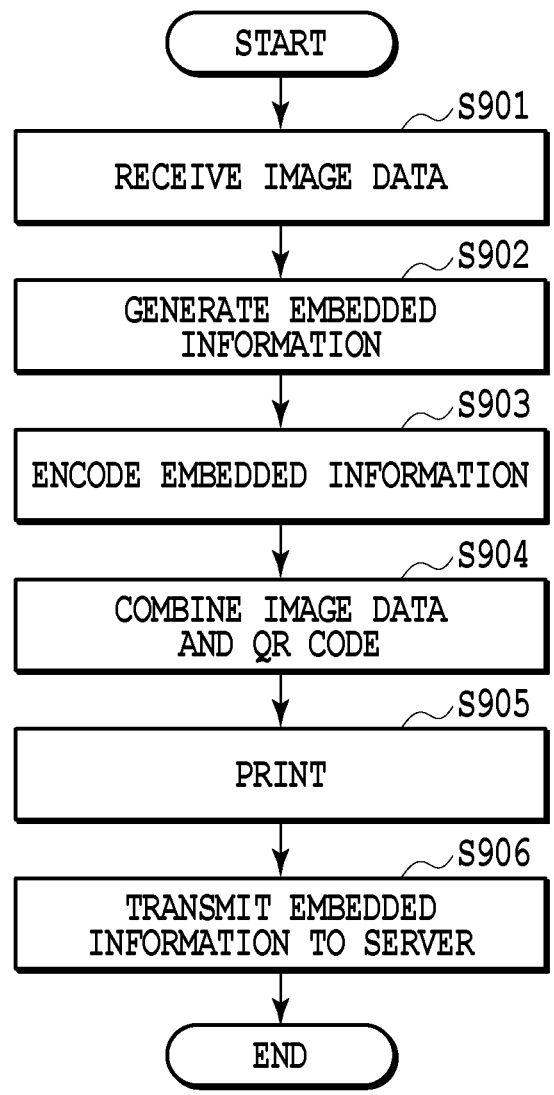
FIG. 9 is a flowchart showing a flow when performing printing processing in an MFP based on image data from a PC.

FIG. 9 is a flowchart showing a flow when printing processing is performed in the MFPs 102/103 based on the image data received from the PC 101. As in FIG. 6, the application (program) stored in the memory 204 is activated by the operation of a user and each of the following steps is implemented by the CPU 300 executing the application.

When a user provides instructions for printing in the PC 101, in step 901, the data transmission/reception unit 401 receives image data from the PC 101. Here, explanation will be given on the assumption that the received image data is image data rasterized etc. and in a state suitable for printing (bit map data). When the received image data is PDL data, in an image processing unit, not shown schematically, processing the image data into image data suitable for printing processing, such as interpreting of the PDL data, rasterizing, and half-toning, is performed in parallel with steps 902 and 903, to be described later.

In step 902, the embedded information update unit 405 generates embedded information to be embedded in a document to be printed and output, for example, each piece of information of the name of a user who has provides instructions for printing this time, the time and date when printed and output, and a document ID for uniquely identifying a printed document.

In step 903, the encoding unit 406 encodes the embedded information generated in step 902 and generates a QR code.

In step 904, the image combining unit 407 combines the generated QR code and the image data (image data suitable for printing) received in step 901 and generates combined image attached with a QR code.

In step 905, the printing processing unit 408 forms an image on a recording medium based on the generated combined image data and outputs it. The created printed document is output to an output tray, not shown schematically. When printing processing is completed, the processing proceeds to step 906.

In step 906, the data transmission/reception unit 401 transmits the embedded information generated in step 902 to the server 104.

<Explanation of Processing in Server 104>

In the present embodiment, the server 104 saves the embedded information received from the MFPs 102/103 in roughly two stages. Details are explained below.

When the data transmission/reception unit 411 of the server 104 receives embedded information from the MFPs 102/103, it is sent to the embedded information saving processing unit 412 by the control unit 410.

FIGS. 11A to 11I each show an example of embedded information sent from the MFP 102 or the MFP 103. In the diagrams, the contents in the "Extracted Embedded Information" box are the contents of the embedded information (first information) before the update extracted from the QR code of the original document when the contents of the operation instructions of a user are copying. Consequently, when the contents of the operation instructions of a user are direct printing of image data or when the contents are instructions for copying, but detection of the QR code from the original document or decoding of the detected QR code fails, the "Extracted Embedded Information" box will be blank. FIGS. 11A to 11I are explained below, respectively.

First, FIG. 11A shows embedded information generated when a user whose name is "Kazuhiro Hiraoka" provides instructions for printing from a PC etc. at "2008/1/30 9 : 53). To this printed document, "abc" is given as a document ID. The document is printed based on image data transmitted from a PC etc., and thus the detection of a QR code is not performed and the "Extracted Embedded Information" box is blank.

FIG. 11B shows extracted embedded information and updated embedded information when the document attached with "abc" described in FIG. 11A is copied by a user whose name is "David Jenegal" at "2008/9/21 14 : 33". To this duplicated document, a document ID "abc-1" is given. Then, in the "Extracted Embedded Information" box, the embedded information before update (the embedded information of the original document with "abc") is described. This indicates that the detection of the QR code of the original document and decoding processing are performed without fail at the time of copying.

FIG. 11C shows extracted embedded information and updated embedded information when the duplicated document with "abc-1" described in FIG. 11B is copied by a user whose name is "Taro Yamada" at "2009/6/15 11 : 25". To this duplicated document, a document ID "abc-2" is given. Here also, in the "Extracted Embedded Information" box, the embedded information before update (the embedded information of the original document with "abc-1") is described.

FIG. 11D shows embedded information generated when a user whose name is "Kazuhiro Hiraoka" has provided instructions for printing from a PC etc. at "2010/1/10 13 : 45". To this document, "def" is given as a document ID. In this case also, the "Extracted Embedded Information" box is blank.

FIG. 11E shows extracted embedded information and updated embedded information when a user whose name is "Toshiro Sadamitsu" has copied the printed document with "def" described in FIG. 11D at "2010/4/10 20 : 43". To this duplicated document, a document ID of "def-1" is given. Here also, in the "Extracted Embedded Information" box, the embedded information before update (the embedded information of the original document with "def") is described.

FIG. 11F shows embedded information generated when a user whose name is "Kazuhiro Hiraoka" has provided instructions for printing from a PC etc. at "2010/7/19 11 : 46". To this printed document, "efg" is given as a document ID. In this case also, the "Extracted Embedded Information" box is blank.

Figure 10A:
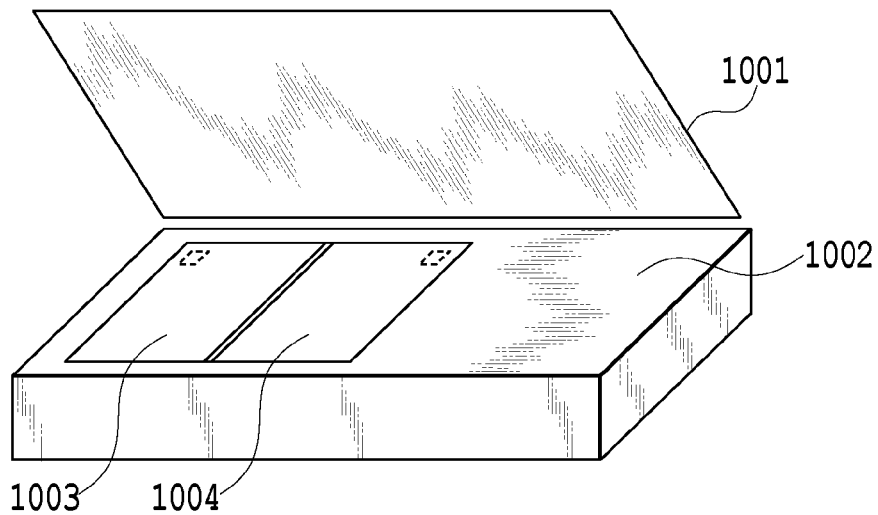
FIGS. 10A and 10B are diagrams showing an instance where two or more code images are detected by one-time scan.

FIG. 11G shows extracted embedded information and updated embedded information when a user whose name is "Taro Yamada" has copied the duplicated document with "def-1" described in FIG. 11E and the printed document with "efg" described in FIG. 11F at a time at "2010/7/28 15 : 03". That is, updated embedded information when two documents are copied at a time in the state in FIG. 10A described above. In this case, as described earlier, the embedded information relating to the document ID "def-1" having information of an older time and date is updated as a result. That is, in the duplicated document to be output, a total of the two QR codes, that is, the updated QR code including the embedded information of the document ID "def1efg-1" and the unupdated QR code including the embedded information of the document ID "efg" exist.

Figure 10B:
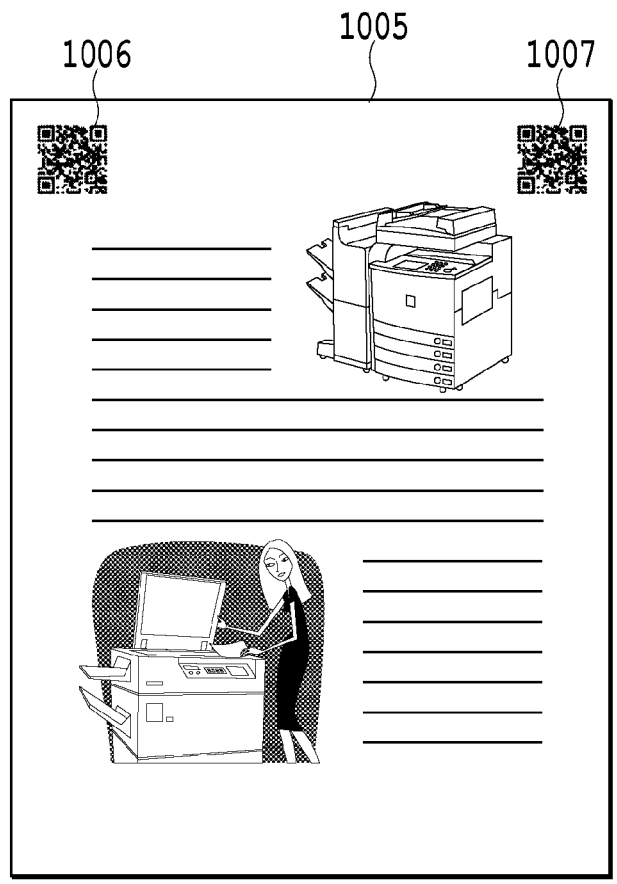

FIG. 11H shows embedded information generated when a user whose name is "Toshiro Sadamitsu" has copied the printed document with "abc" described in FIG. 11A at "2010/8/1 14 : 25". Despite the copy of the printed document with "abc" attached with a code image as the original document, the "Extracted Embedded Information" box is blank and this indicates that the detection of the QR code of the original document or decoding processing has failed. Consequently, in the duplicated document to be output in this case, two QR codes, that is, the new and old QR codes shown in FIG. 10B exist as a result. In the QR code newly attached to the duplicated document, information "hij" is included as a document ID.

FIG. 11I shows extracted embedded information and updated embedded information when a user whose name is "Seiji Mimura" has copied the duplicated document with "hij" described in FIG. 11H at 2010/7/28 15 : 03". Then, in the "Extracted Embedded Information" box, embedded information extracted from both the original QR code and the QR code newly attached at the time of previous copying is described. In this case also, information to be updated is the embedded information extracted from the original QR code having information of the older time and date (that is, the QR code of the original document with "abc"). This can be understood from that the contents of the "Original User's Name" box of the updated embedded information are "Kazuhiro Hiraoka". That is, in the duplicated document to be output, a total of the two QR codes, that is, the updated QR code including the embedded information of the document ID "abchij-1" and the unupdated QR code including the embedded information of the document ID "hij" exist as a result.

Hereinafter, explanation will be given on the assumption that the embedded information shown in FIGS. 11A to 11I is transmitted sequentially from the MFP 102 and the MFP 103.

(Saving in First Saving Processing Unit)

Upon receipt of the above-described embedded information, the first saving processing unit of the embedded information saving processing unit 412 saves sequentially as follows.

FIG. 12 is a diagram showing an example of the first data table created in the first saving processing unit. It is known that data 1 to 9 corresponding to the oldest embedded information in FIG. 11A to the most recent embedded information in FIG. 11I are stored sequentially from the top. This first data table includes Original Document ID 1202 (if it exists), Latest User's Name 1203 of a user who has output, and Time and Date of output in addition to Document ID 1201 of a document that is output. When an ID is stored in the Original Document ID box means that a QR code is detected from the original document and the decoding processing succeeds and the document ID of the original document can be identified in the copy printing processing. That is, even when copying and outputting, if the QR code of the original document cannot be detected or decoded, the display of the Original Document ID box 1202 will be blank. Furthermore, data 7 and data 9 in which the two original document IDs exist indicate that two QR codes are detected and decoded by the scan at the time of copying and the existence of the two original documents are identified.

When the saving processing of the embedded information in the first saving processing unit is completed, the processing moves to the processing in a second saving processing unit.
(Saving in Second Saving Processing Unit)

Figure 13:
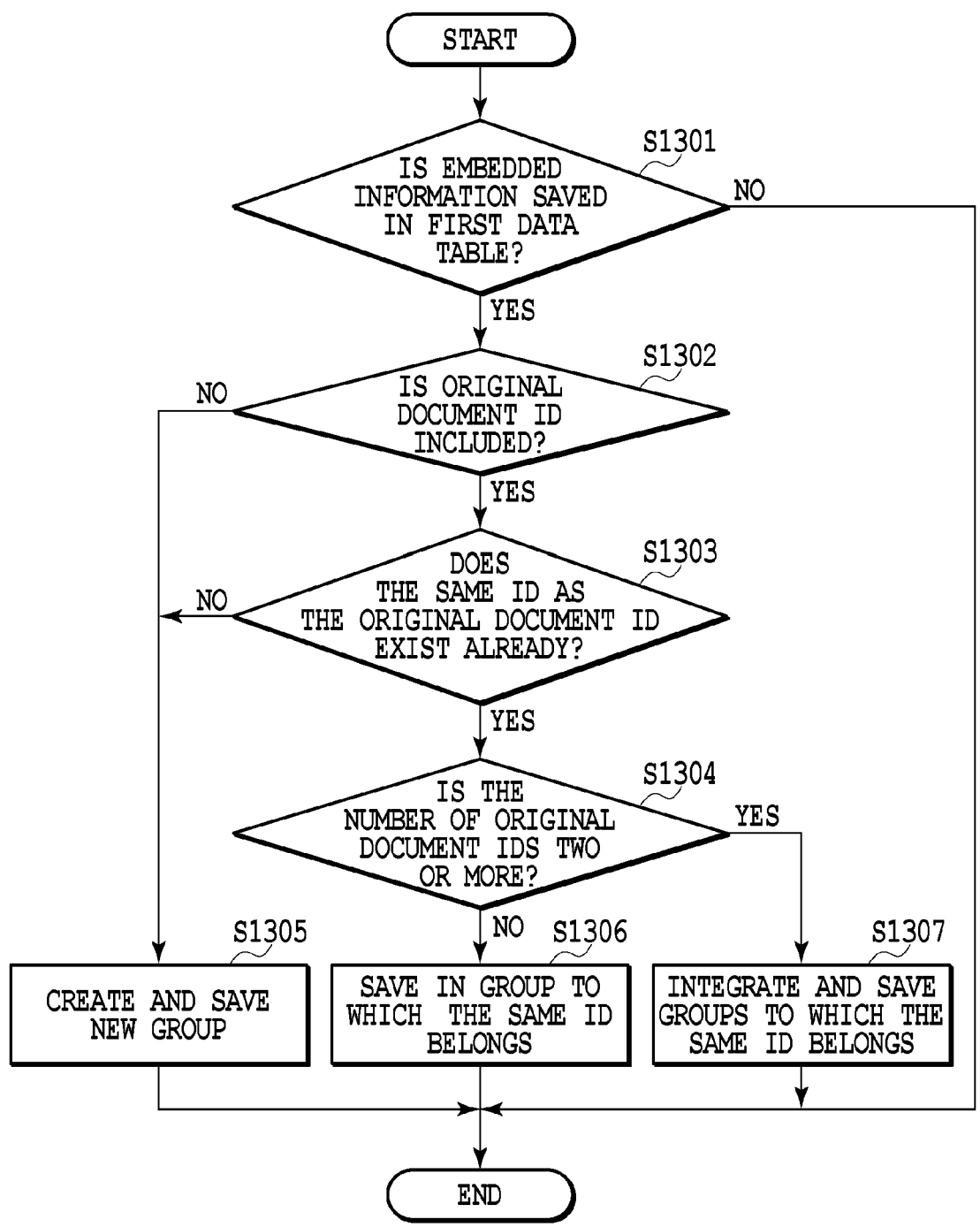
FIG. 13 is a flowchart showing a flow of the processing in a second saving processing unit.

By the second saving processing unit, a second data table in which document IDs are grouped on the basis of units of document data is created. In this case, when a plurality of document IDs is included as an original document of a duplicated document, the groups to which the plurality of document IDs belongs, respectively, are integrated into one group. FIG. 13 is a flowchart showing a flow of the processing in the second saving processing unit.

In step 1301, the second saving processing unit determines whether or not the received embedded information is saved in the first data table by the first saving processing unit. When the embedded information has been saved in the first data table, the processing proceeds to step 1302. When not saved, the present processing is exited.

In step 1302, the second saving processing unit determines whether or not the original document ID is included in the embedded information newly saved in the first data table. When the original document ID is included, the processing proceeds to step 1303. When not included, the processing proceeds to step 1305.

In step 1303, the second saving processing unit determines whether or not the same original document ID as the original document ID within the newly saved embedded information exists in any of the already existing groups in the second data table. When it already exists, the processing proceeds to step 1304 and when not, the processing proceeds to step 1305.

In step 1304, the second saving processing unit determines whether or not the number of the original document IDs in the newly saved embedded information is two or more. When the number is one, the processing proceeds to step 1306 and when the number is two or more, the processing proceeds to step 1307.

In step 1305, the second saving processing unit creates a new group and stores therein the document ID stored in the Document ID box 1201 in FIG. 12 in the newly saved embedded information (hereinafter, referred to as a new document ID).

In step 1306, the second saving processing unit stores the new document ID in the group to which the same document ID as the original document ID within the newly saved embedded information belongs.

In step 1307, the second saving processing unit first integrates the groups to which the same ID as the original document ID within the newly saved embedded information belongs into one group. Then, the second saving processing unit stores the new original document ID in the group into which the groups are integrated.

FIGS. 14A-14I are diagrams showing examples of the second data table created in the second saving processing unit.

In the present embodiment, for convenience of explanation, the new document ID when embedded information can be extracted from a QR code at the time of a scan has the contents in which "-1" is added to the ID of the original document (for example, when the ID of the original document is "abc", the ID of the duplicated document is "abc-1"). Because of this, it is possible to infer the relationship between the documents from the document IDs. However, the document ID actually generated is configured by hashing a character string combining, for example, a user's name and a time and date of output, and thus it is impossible to infer the relationship with another document from the document ID itself. Consequently, it becomes important to create the second data table as shown below.

The second data table sequentially changes as shown in FIGS. 14A to 14I as data is stored in the first data table shown in FIG. 12 in accordance with the embedded information shown in FIGS. 11A-11I. Specifically, the second data table shown in FIG. 14A is created when the embedded information of FIG. 11A is saved in the first data table, the second data table shown in FIG. 14B when the embedded information of FIG. 11B is saved in the first data table, and so on.

To explain in more detail, for example, when the embedded information of FIG. 11A is saved in the first data table as data 1 in FIG. 12, "Yes" will be result of determination in step 1301 in FIG. 13 and "No" in step 1302 that follows and the processing proceeds to step 1305. Then, in step 1305, a new group (in this case, group 1) is created and "abc", which is the document ID of the printed document that is output, is stored therein.

Next, when the embedded information of FIG. 11B is saved in the first data table as data 2 in FIG. 12, "Yes" will be the result of determination in step 1301 and "Yes" in both steps 1302 and 1303 that follow, and then "No" in step 1304 and the processing proceeds to the processing in step 1306. Then, in step 1306, "abc-1", which is the document ID of the output duplicated document, is stored in the group 1 in which the same ID "abc" as the "abc" of the original document ID is already stored.

Similarly, up to the second data tables in FIGS. 14C to 14F are created and when the embedded information of FIG. 11G is saved in the first data table as the data 7 in FIG. 12, the second data table shown in FIG. 14G is created as follows. That is, "Yes" will be the result of determination in step 1301 in the flowchart in FIG. 13, "Yes" in all steps 1302 to 1304 that follow, and then the processing proceeds to the processing in step 1307. Then, in step 1307, one new group "group 2+3" is created by integrating the "group 2" and the "group 3" to which the two original document IDs "def-1" and "efg" belong, respectively. As a result, the document IDs "def", "def-1" that belongs to the group 2 and "efg" that belongs to the group 3 come to belong to the same group. Then, "def1efg-1", which is the document ID of the output duplicated document is stored therein. At this time, the "group 2" and the "group 3" before integration are no longer necessary, and thus the are erased and instead association is formed within the integrated "group 2+3" so that the groups to which each document ID used to belong before the integration can be understood. In FIG. 14G, attribute information "the former group 2" is attached to the document IDs "def" and "def-1" and attribute information "the former group 3" to the document ID "efg", respectively, so that the former groups to which each document ID used to belong can be known.

Furthermore, when the embedded information of FIG. 11H is saved in the first data table as the data 8 in FIG. 12, the new group 4 is created in the second data table and "hij", which is the document ID of the output duplicated document, is stored therein. Then, when the embedded information of FIG. 11I is saved in the first data table as the data 9 in FIG. 12, the second data table as shown in FIG. 14I is created. That is, in step 1307 in the flowchart in FIG. 13, one new group "group 1+4" is created by integrating the "group 1" and the "group 4" to which the two original document IDs "abc" and "hij" belong, respectively. Then, "abchij-1", which is the document ID of the output duplicated document, is stored therein. Moreover, the "group 1" and the "group 4" before the integration are no longer necessary, and thus they are erased and in the "group 1+4" after the integration, attribute information "the former group 1" and "the former group 4" are attached to the document IDs "abc" and "hij", respectively. As a result, all the document IDs "abc", "abc-1", "abc-2", "hij" of originally the same document data come to belong to the same group.

According to the present invention, since decoded embedded information is saved in the server by the processing described above, it is possible to trace the operation history even when a plurality of QR codes is detected and decoded from the original document at the time of copying. That is, by the first data table and the second data table created as described above, it is possible to correctly trace the operation history, such as who has generated the document data and who has copied it.

For example, as to a duplicated document obtained by a user whose name is "Taro Yamada" copying two documents, both the document ID "def1efg-1" and the original document IDs "def-1", "efg" belong to the "group 2+3". Consequently, it can be known that the document ID "def" similarly belonging to the "group 2+3" is the document from which the duplicated document with "def1efg-1" originates.

Furthermore, it can be known that the ID "abchij-1" of the duplicated document obtained by a user whose name is "Seiji Mimura" copying does not originate directly only from the original document with "hij". That is, the ID "abchij-1" originates not only from the original document with "hij" but also from the document IDs "abc", "abc-1", "abc-2" belonging to the same "group 1+4".

<Tracing Operation History of Document Data>

As described above, pieces of information for identifying a document, such as a document ID, are associated with one another and saved in the server, and thus it is possible for a user to trace the operation history of document data without fail.

In the present embodiment, for example, when a user whose name is "Seiji Miura" desires to know the history of the document (FIG. 11I) duplicated on Aug. 31, 2010 by the user "Seiji Miura", it is possible to confirm the history as follows.

First, the user "Seiji Miura" provides instructions to search for history information from a user interface screen (not shown schematically) displayed on the display unit 301 in the MFPs 102/103. Upon receipt of the instructions, the control unit 400 of the MFPs 102/103 causes the scan processing unit 402 to provide instructions to read the document and the scan processing unit 402 scans the duplicated document placed on the document table. As described earlier, to the duplicated document, two QR codes are attached.

Here, it is defined that two QR codes are detected/decoded from the image data obtained by the scan and two kinds of document IDs "abchij-1" and "hij" are extracted. In this case, the MFPs 102/103 transmit the two kinds of the extracted document IDs "abchij-1" and "hij" to the server 104 via the data transmission/reception unit 401. In the server 104 that has received the two document IDs, the control unit 410 causes the embedded information finding unit 415 to provide instructions to find associated information. Upon receipt of the instructions, the embedded information finding unit 415 first refers to the second saving processing unit within the embedded information saving processing unit 412 and finds a document ID associated with "abchij-1" and "hij". In this case, "abchij-1" and "hij" belong to the same group, and thus the document IDs "abc", "abc-1", "abc-2", "hij", "abchij-1" within the group are found as associated document IDs. Furthermore, the embedded information finding unit 415 refers to the first saving processing unit and finds information (see FIG. 12) corresponding to each document ID found. That is, such information is found as to, for example, the document ID "abc-1", that the original document has the document ID "abc", the user who has provided instructions for outputting is "David Jenegal", and the time and date of output is "2008/9/21 14 : 33".

In contrast, it is defined that only one QR code updated at the time of duplication is detected/decoded from the image data obtained by the scan and only the document ID "abchij-1" can be extracted. In this case, the MFPs 102-103 transmit the extracted document ID "abchij-1" to the server 104 via the data transmission/reception unit 401. In the server 104 that has received the document ID, the embedded information finding unit 415 finds information associated with "abchij-1". That is, "abc", "abc-1", "abc-2", "hij", "abchij-1", which are the document IDs within the group to which "abchij-1" belongs and information corresponding to each document ID are found. That is, even in such a case, it is possible for the embedded information finding unit 415 to find the information included in the QR code left attached, of course, as well as the information included in the QR code erased by the update of the QR code at the time of duplication.

Furthermore, it is defined that only one QR code that is not updated at the time of duplication is detected/decoded from the image data obtained by the scan and only the document ID "hij" can be extracted. In this case, the MFPs 102/103 transmit the extracted document ID "hij" to the server 104 via the data transmission/reception unit 401. In the server that has received the information, the embedded information finding unit 415 finds information associated with "hij" as in the above case. In this case also, "abc", "abc-1", "abc-2", "hij", "abchij-1", which are the document IDs within the group to which "hij" belongs and information corresponding to each document ID are found as a result.

The document IDs and other information corresponding to the document IDs found as described above are sent to the MFPs 102/103 via the data transmission/reception unit 411. Then, the received information is displayed on the display unit 301 of the MFPs 102/103.

As described above, in any case, it is possible for the user "Seiji Miura" to correctly know the history of the duplicated document on Aug. 31, 2010. That is, it is possible for the user to know without exception not only the information before update of the QR code updated at the time of duplication (that is, the information of the QR code erased at the time of duplication) but also the information of the QR code not updated as to the duplicated document attached with a plurality of QR codes. Here, the case has been explained, where searching of the history information is instructed via the MFPs 102/103, but it is needless to say that it is also possible to provide instructions to search for history information via a PC to which a scanner is connected and the above-mentioned aspects are not limited.

In this manner, it is possible for a user to confirm the operation history of the document data by viewing information displayed, for example, on the display unit 301 of the MFPs 102/103.

As described above, according to the present invention, it is possible to securely confirm the history because the operation history of document data is saved in the server in a state where it can be traced, even when a plurality of code images is detected/decoded from the original document at the time of copying.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-202118, filed Sep. 9, 2010 and 2011-156603 filed Jul. 15, 2011 which are hereby incorporated by reference herein in their entirety.

What is claimed is:

1. A server for managing the operation history of document data, comprising:
   a receiving unit configured to receive first information obtained by decoding a code image attached to an original document at the time of duplication, and second information that is information of a code image attached to a duplicated document and which is obtained by updating the first information;
   a first saving processing unit configured to save information included in the first information for identifying the original document and information included in the second information for identifying the duplicated document upon receipt of the first information and the second information; and
   a second saving processing unit configured to save information for identifying the duplicated document in each predetermined group after the saving is performed in the first saving processing unit,
   wherein the second saving processing unit, when the number of pieces of information for identifying the original document saved by the first saving processing unit is two or more, integrates each group including the same information as the saved information for identifying the original document into one group.

2. The server according to the claim 1,
   wherein the second saving processing unit includes:
      a determining unit configured to determine whether the same information as the information for identifying the original document saved by the first saving processing unit exists in an already existing group;
      a determining unit configured to determine whether or not the number of pieces of information for identifying the original document saved by the first saving processing unit is two or more when it is determined that the same information exists in an already existing group;
      an integrating unit configured to, when it is determined that the number of pieces of information for identifying the original document saved by the first saving processing unit is two or more, integrate each group having the information determined to be the same as the saved information for identifying the original document into one group; and
      an assigning unit configured to assign the information for identifying the duplicated document to the integrated group.

3. An image forming apparatus connected to the server according to claim 1 and comprising a duplication function of a document, comprising:
   a scan processing unit configured to scan an original document upon receipt of instructions for duplication;
   a decoding unit configured to decode a code image attached to the original document;
   an information updating unit configured to update the first information obtained by the decoding to generate the second information to be attached to a duplicated document; and
   a transmitting unit configured to transmit the first information and the second information to the server.

4. A system comprising:
   an apparatus including:
      an attaching unit configured to extract information by decoding a code image attached to an original document, erase the code image, and attach an alternative code image including new information to a duplicated document at the time of duplication; and
      a transmitting unit configured to transmit the extracted information and the information included in the alternative code image; and
   a server including:
      a saving unit configured to receive the extracted information and the information included in the alternative code image from the apparatus and save the information associated with each other; and
      a finding unit configured to find information included in the erased code image from the information upon receipt of the information included in the alternative code image attached to the duplicated document from the apparatus,
   wherein the following processing (1) to (3) is performed when a plurality of pieces of information is extracted by decoding a plurality of code images attached to the original document at the time of duplication:
   (1) the attaching unit of the apparatus erases one code image of the plurality of code images and attaches an alternative code image including new information to a duplicated document;
   (2) the transmitting unit of the apparatus transmits the extracted plurality of pieces of information and the information included in the alternative code image to the server; and
   (3) the saving unit of the server saves the received extracted plurality of pieces of information and the information included in the alternative code image associated with one another.

5. The system according to claim 4,
   wherein upon receipt of information included in a code image newly attached to a duplicated document created from an original document in which a plurality of code images attached thereon is decoded, the finding unit of the server finds information included in the erased code image and information included in the remaining code images left attached of the plurality of code images attached to the original document from the information.

6. The system according to claim 4,
wherein the attaching unit of the apparatus implements erasure of the code image and attachment of the alternative code image to a duplicated document by overwriting the code image to be erased with the alternative code image.

7. A management method of a server for managing the operation history of document data, the method comprising:
a step of receiving first information obtained by decoding a code image attached to an original document at the time of duplication, and second information that is information of a code image attached to a duplicated document and which is obtained by updating the first information;
a first saving processing step of saving information included in the first information for identifying the original document and information included in the second information for identifying the duplicated document upon receipt of the first information and the second information; and
a second saving processing step of saving information for identifying the duplicated document in each predetermined group after the saving is performed in the first saving processing step,
wherein the second saving processing step further includes a step of, when the number of pieces of information for identifying the original document saved in the first saving processing step is two or more, integrating each group including the same information as the saved plurality information for identifying the original document into one group.

8. A computer-readable recording medium having computer-executable instructions for performing a management method of a server for managing the operation history of document data, the method comprising:
a step of receiving first information obtained by decoding a code image attached to an original document at the time of duplication, and second information that is information of a code image attached to a duplicated document and which is obtained by updating the first information;
a first saving processing step of saving information included in the first information for identifying the original document and information included in the second information for identifying the duplicated document upon receipt of the first information and the second information; and
a second saving processing step of saving information for identifying the duplicated document in each predetermined group after the saving is performed in the first saving processing step,
wherein the second saving processing step further includes a step of, when the number of pieces of information for identifying the original document saved in the first saving processing step is two or more, integrating each group including the same information as the saved plurality information for identifying the original document into one group.

9. A method for managing the operation history of document data of a system comprising:
an apparatus including:
an attaching unit configured to extract information by decoding a code image attached to an original document, erase the code image, and attach an alternative code image including new information to a duplicated document; and
a transmitting unit configured to transmit the extracted information and the information included in the alternative code image; and
a server including:
a saving unit configured to receive the extracted information and the information included in the alternative code image from the apparatus and save the information associated with each other; and
a finding unit configured to find information included in the erased code image from the information upon receipt of the information included in the alternative code image attached to the duplicated document from the apparatus,
wherein the following processing (1) to (3) is performed when a plurality of pieces of information is extracted by decoding a plurality of code images attached to the original document at the time of duplication:
(1) the attaching unit of the apparatus erases one code image of the plurality of code images and attaches an alternative code image including new information to a duplicated document;
(2) the transmitting unit of the apparatus transmits the extracted plurality of pieces of information and the information included in the alternative code image to the server; and
(3) the saving unit of the server saves the received extracted plurality of pieces of information and the information included in the alternative code image associated with one another.

10. A non-transitory computer-readable recording medium having computer-executable instructions for performing a method for managing the operation history of document data of a system comprising:
an apparatus including:
an attaching unit configured to extract information by decoding a code image attached to an original document, erase the code image, and attach an alternative code image including new information to a duplicated document; and
a transmitting unit configured to transmit the extracted information and the information included in the alternative code image; and
a server including:
a saving unit configured to receive the extracted information and the information included in the alternative code image from the apparatus and save the information associated with each other; and
a finding unit configured to find information included in the erased code image from the information upon receipt of the information included in the alternative code image attached to the duplicated document from the apparatus,
wherein the following processing (1) to (3) is performed when a plurality of pieces of information is extracted by decoding a plurality of code images attached to the original document at the time of duplication:
(1) the attaching unit of the apparatus erases one code image of the plurality of code images and attaches an alternative code image including new information to a duplicated document;
(2) the transmitting unit of the apparatus transmits the extracted plurality of pieces of information and the information included in the alternative code image to the server; and
(3) the saving unit of the server saves the received extracted plurality of pieces of information and the information included in the alternative code image associated with one another.

* * * * *